United States Patent [19]

Imada et al.

[11] 4,293,585
[45] Oct. 6, 1981

[54] METHOD FOR THE PREPARATION OF POLARIZING FILMS OR SHEETS

[75] Inventors: Kiyoshi Imada, Omiya; Susumu Ueno, Ibaraki; Yasuhide Nishina, Ibaraki; Hirokazu Nomura, Ibaraki, all of Japan

[73] Assignee: Shin-etsu Chemical Co., Ltd., Tokyo, Japan

[21] Appl. No.: 168,082

[22] Filed: Jul. 10, 1980

[30] Foreign Application Priority Data

Jul. 16, 1979 [JP] Japan .................................. 54-90221

[51] Int. Cl.$^3$ ............................................... B05D 3/06
[52] U.S. Cl. ..................................... 427/40; 350/398; 427/163; 428/520; 428/336
[58] Field of Search ....................... 427/38, 39, 40, 41; 350/154, 155; 428/520

[56] References Cited

U.S. PATENT DOCUMENTS

| | | | |
|---|---|---|---|
| 2,402,166 | 6/1946 | Land | 350/155 |
| 4,072,769 | 2/1978 | Lidel | 427/40 |
| 4,166,871 | 9/1979 | Schuler | 427/163 |
| 4,229,498 | 10/1980 | Suzuki et al. | 428/520 |

*Primary Examiner*—John H. Newsome
*Attorney, Agent, or Firm*—Toren, McGeady and Stanger

[57] ABSTRACT

The invention provides a novel method for the preparation of a polarizing film or sheet based on a polyvinyl alcohol which is easily prepared and easy to handle. The inventive method comprises first subjecting a substrate film or sheet of a vinyl chloride resin to exposure to low temperature plasma, the surface of the substrate is coated with an aqueous solution of a polyvinyl alcohol and dried so as that a coating layer of the polyvinyl alcohol is formed as firmly bonded to the substrate surface owing to the increased affinity of the surface by the plasma treatment, the thus polyvinyl alcohol-clad substrate is stretched as such unidirectionally and the stretched polyvinyl alcohol layer is treated with iodine to be imparted with a polarizing power. The adhesion between the substrate and the polyvinyl alcohol layer is so strong without an adhesive agent that the difficulty in the prior art in handling fragile stretched polyvinyl alcohol film is completely overcome.

6 Claims, No Drawings

METHOD FOR THE PREPARATION OF POLARIZING FILMS OR SHEETS

BACKGROUND OF THE INVENTION

The present invention relates to an improved method for the preparation of a polarizing film or sheet or, more particularly, to a method for the preparation of a polarizing film or sheet based on a polyvinyl alcohol film unidirectionally stretched and treated with iodine.

It is well known that, when stretched unidirectionally, dyed with iodine and then subjected to a stabilizing treatment, films of a polyvinyl alcohol exhibit polarizing effect. These polyvinyl alcohol based polarizing films have several problems that the stretched polyvinyl alcohol films are very fragile so that they must be handled with utmost care in the iodine treatment and the stabilization treatment and the thus obtained polarizing film must be adhesively bonded to a reinforcing substrate as soon as possible to avoid possible break of the film though not always with satisfactory results due to the break of the film in the step of bonding with an adhesive agent.

Accordingly, it has long been desired to develop a novel method for the preparation of a polarizing film or sheet with a polyvinyl alcohol as the base material without the above described problems.

SUMMARY OF THE INVENTION

It is therefore an object of the present invention to provide a novel and improved polarizing film or sheet and also to provide a novel and improved method for the preparation of a polarizing film or sheet with a polyvinyl alcohol as a base material free from the above described problems in the prior art polarizing films or sheets based on a polyvinyl alcohol.

The method of the invention for the preparation of a polarizing film or sheet based on a polyvinyl alcohol comprises the steps of (a) subjecting a film or sheet of a vinyl chloride-based resin as a substrate to exposure to an atmosphere of low temperature plasma of a gas having no polymerizability in plasma, (b) coating the surface of the thus plasma-treated substrate with an aqueous solution containing a polyvinyl alcohol as dissolved therein, (c) drying the substrate coated with the aqueous solution containing the polyvinyl alcohol to form a dried film of the polyvinyl alcohol firmly bonded to the surface of the substrate, (d) stretching the thus polyvinyl alcohol-clad substrate unidirectionally, and (e) treating the film of the polyvinyl alcohol bonded to the stretched substrate with iodine.

The above described inventive method does not involve the troublesome step of handling the fragile stretched film of a polyvinyl alcohol so that a polyvinyl alcohol-based polarizing film or sheet can be prepared easily even by persons without skill.

Further, the polarizing film or sheet obtained by the above inventive method has very excellent performance as described hereinafter without the use of an adhesive agent.

DETAILED DESCRIPTION OF THE PREFERRED EMBODIMENTS

The vinyl chloride-based resin of which the substrate film or sheet is made can be not only a homopolymeric polyvinyl chloride but also any kind of copolymeric resins of which the main monomeric component, say, 50% by weight or more, is vinyl chloride. Polymer blends are also suitable. The thickness of the substrate film or sheet should be determined in consideration of the balance between the mechanical strengths and transmission of light according to need. Films or sheets of a suitable resin type and desired thickness are readily available as commercial products.

The first step of the inventive method is the exposure of the surface of the substrate film or sheet to an atmosphere of low temperature plasma of a gas having no polymerizability in the plasma condition under a pressure in the range from 0.001 Torr to 10 Torr. The low temperature plasma is readily generated in the gaseous atmosphere of the above specified pressure by applying a high frequency, e.g. 13.56 MHz, electric power of 10 to 500 watts to the electrodes effecting electric discharge through the atmosphere. Satisfactory results can be obtained either by the electrode discharge or by the electrodeless discharge. The optimum time for the plasma treatment differ widely depending on the energy density of the plasma atmosphere but it is usually in the range from a few seconds to several tens of minutes.

It is of course that the frequency band for the electric discharge is not limited to the above mentioned high frequency region but may range from direct current to low frequency to microwave regions. The mode of the electric discharge is also not limitative including, in addition to the glow discharge, spark discharge and silent discharge. Exterior electrodes and inside electrodes as well as a coiled electrode may be used as the discharge electrode connected to the power supply by capacitive coupling or inductive coupling. At any rate, however, it is a requirement that the surface of the shaped article is never subject to the thermal denaturation by the heat evolved in the electric discharge.

What is meant by the term of a gas having no polymerizability in the plasma condition is a gas from which products with high molecular weights are not formed when low temperature plasma is generated in the low pressure atmosphere of the gas. Suitable gases are mostly inorganic exemplified by helium, neon, argon, nitrogen, nitrous oxide, nitrogen dioxide, oxygen, air, carbon monoxide, carbon dioxide, hydrogen, chlorine and hydrogen chloride. These gases are used either singly or as a mixture of two kinds or more. The pressure of the gaseous atmosphere in the plasma generating chamber is in the range from 0.001 Torr to 10 Torr or, preferably, from 0.01 Torr to 1 Torr in order to obtain stable plasma discharge. The next step is coating the thus plasma-treated surface of the film or sheet of the vinyl chloride-based resin with an aqueous solution of a polyvinyl alcohol. Any kinds of polyvinyl alcohols may be used in the inventive method including completely saponified ones and partially saponified ones in so far as aqueous solution of the polymer can be prepared. Polyvinyl alcohols having a degree of saponification larger than 95% are preferred in most cases. The average degree of polymerization or average molecular weight of the polyvinyl alcohol is also not limitative. These parameters of the polyvinyl alcohol should be determined according to the performance desired in the polarizing film or sheet prepared therewith. The concentration and the viscosity of the aqueous solution are the factors ruling the thickness of the coating layer of the polyvinyl alcohol on the surface of the film or sheet of the vinyl chloride-based resin to be clad and hence should be determined according to the desired polarizing power. Generally speaking, coating layers with sufficient thickness can hardly be obtained with an aqueous solution of a polyvinyl alcohol in a concentration of smaller than 0.1% by weight whereas an aqueous solution of a polyvinyl alcohol in a concentration exceeding several tens of % by weight is obtained with difficulties due to the limited solubility of the polymer in water. When a coating layer of a polyvinyl alcohol having a thickness in excess of that obtained with an aqueous solution of the polyvinyl alcohol of the maximum concentration is desired, it is recommended that coating with the solution is repeated several times with drying after each time of the coating. Usually a thickness of 0.001 to 0.1 mm is preferred.

Different from the surface of a film or sheet of a vinyl chloride-based resin not treated with low temperature plasma, the plasma-treated surface of the film or sheet is not repellent to an aqueous solution so that the aqueous solution of the polyvinyl alcohol can spread evenly on the surface regardless of the method of coating which can be dipping, brushing, spraying or any other suitable means. If not essential, the plasma-treated surface of the film or sheet is coated with the aqueous solution of the polyvinyl alcohol preferably as soon as possible after completion of the plasma treatment so as not to be influenced by a possible alteration in the favorable surface condition obtained by the plasma treatment. Practically, no noticeable changes are observed in the affinity of the plasma-treated surface to the aqueous solution of the polyvinyl alcohol when coating is performed within 24 hours after completion of the plasma treatment.

The film or sheet for the substrate coated with the aqueous solution of the polyvinyl alcohol is then dried so that the dried layer of the polyvinyl alcohol is firmly bonded to the surface of the substrate. This drying is performed at a temperature from room temperature to 130° C. or, preferably, from 50° to 70° C. At any rate, care must be taken not to cause thermal deformation of the substrate film or sheet of the vinyl chloride-based resin at an excessively high drying temperature. It is optional that drying is performed under a reduced pressure to accelerate evaporation of water. It should also be avoided that foaming or bubble formation takes place by the water vapor produced in the aqueous coating layer during drying.

The dried coating layer of the polyvinyl alcohol is firmly and integrally bonded to the surface of the substrate film or sheet and no longer peeled off in the subsequent step of processing into desired polarizing film or sheet. This unexpectedly strong bonding even without the use of an adhesive agent is obtained presumably by the enhancement of the wettability, formation of functional groups and roughening on the surface of the substrate treated with low temperature plasma.

The next step of the inventive method is stretching of the composite film or sheet of the vinyl chloride-based resin clad with the polyvinyl alcohol integrally. This unidirectional stretching is carried out by use of a conventional stretching roller at a temperature of about 50° to 200° C. The ratio of stretching is usually in the range from 1.5 to 10 times or, preferably, from 2 to 5 times of the unstretched length of the film or sheet from the standpoint of obtaining sufficient degree of polarization. It is noteworthy that, in this stretching step, the coating layer of the polyvinyl alcohol is never peeled off from the surface of the substrate maintaining the firm bonding even after completion of stretching of the largest stretching ratio giving a very remarkable advantage of the present invention over prior art methods.

The stretched composite sheet or film is then subjected to the treatment or dyeing with iodine. The procedure of this treatment is well known in the art without particular limitations and the stretched composite film or sheet is dipped in an aqueous solution containing, for example, iodine and potassium iodide as dissolved therein.

It is desirable that, after completion of the iodine treatment, the film or sheet is subjected to the treatment of stabilization with an object to prevent dissipation of iodine. This treatment of stabilization is carried out by dipping the iodine-treated film or sheet in an aqueous solution containing, for example, boric acid, sodium thiosulfate and potassium iodide as combined, if necessary, with heating at a temperature up to 60° C.

The thus obtained polarizing film or sheet is then, according to need, subjected to heat treatment to give the desired product. When the product is in the form of a relatively thick sheet, it may be used as such but, when it is a thin film, it is optional that the thin polarizing film is sandwiched with films of, for example, cellulose triacetate to give a polarizing sheet or plate easy to handle. In any case, it is desirable, in order to enhance moisture resistance of the polarizing film or sheet, that the surface thereof is coated with an aqueous emulsion of an acrylic resin, copolymers of ethylene and vinyl acetate or vinylidene chloride resin to form an overcoating layer.

It is an alternative way to obtain a mechanically resistant polarizing sheet of the invention that two sheets of a vinyl chloride resin are each subjected to the plasma treatment, coated on one surface thereof with a coating layer of the polyvinyl alcohol followed by stretching and iodine treatment as described above and laminated with each other in such a manner that the layers of the polyvinyl alcohol are in direct contact with each other with the bare surfaces of the substrate sheets facing outwardly.

The present invention provides a novel method for the preparation of polarizing film or sheets of excellent performance with inexpensiveness in a continuous process. The polarizing films or sheets of the invention are useful for sunglasses, optical uses, displays, strain inspection instruments, antiglare coverings for automobiles and the like.

In the following, the present invention is described in further detail by way of examples.

EXAMPLE 1

A resin composition composed of 100 parts by weight of a homopolymeric polyvinyl chloride resin having an average degree of polymerization of about 700 (TK-700, a product by Shin-Etsu Chemical Co., Japan), 5 parts by weight of an epoxybased stabilizer (O-130P, a product by Adeka Argus Chemical Co., Japan), 0.2 part by weight of calcium stearate and 1.0 part by weight of an organotin containing stabilizer (T-17MJ, a product by Katsuda Kako Co., Japan) was milled in a roller at 180° C. for 10 minutes and then shaped by compression molding at 185° C. into a sheet of 0.2 mm thickness.

This sheet was placed in an apparatus for plasma generation and both surfaces of the sheet were exposed for 10 minutes to the atmosphere of low temperature plasma generated by the electric discharge with application of a 150 watts high frequency electric power at 13.56 MHz while the pressure in the plasma chamber was controlled and maintained at 0.4 Torr by passing argon gas under reduced pressure.

The thus plasma-treated substrate sheet was dipped in a 5% by weight aqueous solution of a polyvinyl alcohol having an average degree of polymerization of about 2000 and a degree of saponification of about 99.5% or higher (Poval C-20, a product by Shin-Etsu Chemical Co.), pulled up from the solution and air-dried for 3 days to form coating layers of the polyvinyl alcohol of 0.03 mm thickness firmly bonded to the surfaces of the substrate sheet.

The polyvinyl alcohol-clad substrate sheet of the polyvinyl chloride resin was then stretched by use of a stretching machine at 90° C. in a stretching ratio of 300%.

This stretched sheet was subjected to an iodine treatment by dipping for 30 seconds in an aqueous solution containing 1.5% by weight of iodine and 7.5% by weight of potassium iodide followed by a stabilization treatment by dipping for 1 minute in an aqueous solution containing 10% by weight of boric acid, 0.2% by weight of sodium thiosulfate and 0.25% by weight of potassium iodide.

The polarization performance of the thus obtained sheet was as follows.

| | |
|---|---|
| Light transmission through a single sheet | 40.8% |
| Light transmission through two sheets crossed at right angle | 2.3% |
| Degree of polarization | 92.0% |

EXAMPLE 2

A resin composition composed of 50 parts by weight of a homopolymeric polyvinyl chloride resin having an average degree of polymerization of about 700 (TK-700, a product by Shin-Etsu Chemical Co.), 50 parts by weight of a copolymer of vinyl chloride and vinyl acetate (SC-500T, a product by the same company), 0.2 part by weight of calcium stearate and 1.0 part by weight of an organotin-containing stabilizer (M-101D, a product by Tokyo Fine Chemical Co., Japan) was milled in a roller at 160° C. for 10 minutes and then shaped by compression molding at 170° C. into a sheet of 0.5 mm thickness.

This sheet was subjected to the treatment with low temperature plasma in the same conditions as in Example 1 except that the pressure of the argon atmosphere was kept at 0.2 Torr instead of 0.4 Torr.

This plasma-treated sheet was dipped in a 10% by weight aqueous solution of a polyvinyl alcohol having an average degree of polymerization of about 500 and a degree of saponification of about 98% or higher (Poval C-05, a product by Shin-Etsu Chemical Co.) and then pulled up and air-dried to form coating films of the polyvinyl alcohol having a thickness of about 0.08 mm firmly bonded on both of the surfaces of the substrate sheet. The thus obtained polyvinyl alcohol-clad sheet was then stretched by use of a stretching machine at 120° C. in a stretching ratio of 200%.

Iodine treatment of the stretched sheet was carried out by dipping the sheet for 15 seconds in an aqueous solution containing 3.0% by weight of iodine and 7.5% by weight of potassium iodide followed by stabilization treatment by dipping the sheet for 1 minute in an aqueous solution containing 7.5% by weight of boric acid, 0.2% by weight of sodium thiosulfate and 0.25% by weight of potassium iodide at 60° C.

The polarization performance of the thus obtained sheet was as follows.

| | |
|---|---|
| Light transmission through a single sheet | 27.6% |
| Light transmission through two sheets crossed at right angle | 1.6% |
| Degree of polarization | 92.5% |

EXAMPLE 3

A commercially available polyvinyl chloride resin sheet of about 0.2 mm thickness (PL Sheet, a product by Shin-Etsu Polymer Co., Japan) was placed in an apparatus for plasma generation and both surfaces of the sheet were exposed for 5 minutes to the atmosphere of low temperature plasma generated by the electric discharge with application of a 300 watts high frequency electric power at 13.56 MHz while the pressure in the plasma chamber was controlled and maintained at 0.4 Torr by passing oxygen gas under reduced pressure.

The thus plasma-treated sheet was dipped in a 7% by weight aqueous solution of a polyvinyl alcohol having an average degree of polymerization of about 1750 and a degree of saponification of about 99% (Poval C-17, a product by Shin-Etsu Chemical Co.) and pulled up and air-dried to form coating layers of the polyvinyl alcohol of about 0.06 mm thickness firmly bonded to the surfaces of the substrate sheet.

The polyvinyl alcohol-clad sheet was stretched by use of a stretching machine at 100° C. in a stretching ratio of 250% and then subjected to the iodine treatment by dipping for 20 seconds in an aqueous solution containing 2% by weight of iodine and 15% by weight of potassium iodide followed by the stabilization treatment by dipping for 1 minute in an aqueous solution containing 10% by weight of boric acid, 0.2% by weight of sodium thiosulfate and 0.3% by weight of potassium iodide at 60° C.

The polarization performance of the thus obtained sheet was as follows.

| | |
|---|---|
| Light transmission through a single sheet | 37% |
| Light transmission through two sheets crossed at right angle | 2.2% |
| Degree of polarization | 93.2% |

What is claimed is:

1. A method for the preparation of a polarizing film or sheet which comprises the steps of
   (a) subjecting a substrate film or sheet of a vinyl chloride-based resin to exposure to an atmosphere of low temperature plasma of a gas having no polymerizability in a plasma condition,
   (b) coating the plasma-treated substrate film or sheet with an aqueous solution of a polyvinyl alcohol,
   (c) drying the thus coated film or sheet to form a coating layer of the polyvinyl alcohol firmly bonded to the surface of the substrate film or sheet,
   (d) stretching unidirectionally the polyvinyl alcohol-clad film or sheet, and
   (e) subjecting the thus stretched film or sheet to an iodine treatment.

2. The method as claimed in claim 1 wherein the polyvinyl alcohol has a degree of saponification of at least 95%.

3. The method as claimed in claim 1 wherein the coating layer of the polyvinyl alcohol firmly bonded to the surface of the substrate film or sheet has a thickness in the range from 0.001 to 0.1 mm.

4. The method as claimed in claim 1 wherein the drying in the step (c) is performed at a temperature from 50° to 70° C.

5. The method as claimed in claim 1 wherein the stretching in the step (d) is performed at a temperature from 50° to 200° C.

6. The method as claimed in claim 1 wherein the ratio of stretching in the step (d) is from 1.5 to 10 times of the unstretched length.

* * * * *